(12) United States Patent
Miura

(10) Patent No.: US 7,619,498 B2
(45) Date of Patent: Nov. 17, 2009

(54) VIBRATOR

(75) Inventor: Naoki Miura, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 399 days.

(21) Appl. No.: 11/784,006

(22) Filed: Apr. 5, 2007

(65) Prior Publication Data

US 2007/0236088 A1    Oct. 11, 2007

(30) Foreign Application Priority Data

Apr. 6, 2006    (JP)    ............... 2006-105698

(51) Int. Cl.
*H01F 7/08* (2006.01)
*H04R 9/02* (2006.01)
*H02K 33/00* (2006.01)

(52) U.S. Cl. ............... 335/222; 310/15; 310/21; 310/30

(58) Field of Classification Search ............... 335/222; 310/15, 21, 23, 28–30, 36, 38; 381/396, 381/400, 412, 413, 420; 340/338.1, 338.2, 340/338.5, 338.6, 391.1

See application file for complete search history.

(56) References Cited

U.S. PATENT DOCUMENTS

| 6,850,138 | B1 | 2/2005 | Sakai |
| 7,538,463 | B2 * | 5/2009 | Miura et al. ............... 310/81 |
| 7,557,474 | B2 * | 7/2009 | Kuwabara et al. ............... 310/21 |
| 2007/0164616 | A1 * | 7/2007 | Kuwabara et al. ............... 310/15 |
| 2007/0182257 | A1 * | 8/2007 | Miura et al. ............... 310/15 |
| 2007/0194635 | A1 * | 8/2007 | Miura ............... 310/15 |
| 2008/0157609 | A1 * | 7/2008 | Wang ............... 310/28 |

FOREIGN PATENT DOCUMENTS

| JP | 2003-9495 A | 1/2003 |
| JP | 2007-194907 A | 8/2007 |
| WO | WO 02/092244 A1 | 11/2002 |

OTHER PUBLICATIONS

GB Search Report dated Jun. 12, 2007 in EPO Patent Application No. GB0706536.0.

* cited by examiner

*Primary Examiner*—Ramon M Barrera
(74) *Attorney, Agent, or Firm*—Brinks Hofer Gilson & Lione

(57) ABSTRACT

A vibrator has a cup-shaped casing, a substrate provided to close an upper end opening of the casing, a magnetic circuit assembly provided in the casing, a first suspension and a second suspension that support the magnetic circuit assembly from above and below, and a voice coil secured to the substrate and inserted into a magnetic gap in the magnetic circuit assembly. The first suspension has an inner fixed portion that is secured to the substrate and that has a radially inner ring-shaped portion and a pair of extensions extending radially outward from mutually diametrically opposing positions on the ring-shaped portion. The first suspension further has a pair of leaf spring portions arcuately extending from the respective extensions through an angle of about 270° in symmetry to each other around the axis of the voice coil. Further, the first suspension has outer fixed portions disposed at the distal end portions of the leaf spring portions and secured to the upper end surface of a weight of the magnetic circuit assembly.

6 Claims, 2 Drawing Sheets

VIBRATOR

This application claims priority under 35 U.S.C. §119 to Japanese Patent Application No. JP2006-105698 filed Apr. 6 2006, the entire content of which is hereby incorporated by reference.

BACKGROUND OF THE INVENTION

1. Field of the Invention

The present invention relates to vibrators that may be incorporated into mobile communications devices such as cellular phones and personal digital assistants (PDAs) to inform the user of an incoming call.

2. Description of the Related Art

Conventionally, mobile communications devices such as cellular phones and PDAs are arranged to inform the user of an incoming call by selectively generating beep sound or melody, or vibrating the housing of the device instead of producing sound. For this purpose, the conventional practice is to employ a structure incorporating a combination of a sound-generating speaker categorized as a microspeaker and a vibrator that generates vibration by rotating an eccentric weight with a small motor. Incorporating both the speaker and the vibrator as stated above, however, is disadvantageous from the viewpoint of achieving size and cost reduction of the device. Under these circumstances, use has recently been made of a magnetically-driven vibrator that can generate both sound and vibration by itself.

FIGS. 3 and 4 of the attached drawings show a structure of such a vibrator disclosed in Japanese Patent Application No. 2006-011087. As illustrated in the figures, the vibrator has a magnetic circuit assembly 21 including a substantially cup-shaped yoke 22 and a combination of a magnet 23 and a top plate 24 that are successively stacked in the yoke 22. An air gap (magnetic gap) g is formed between the inner peripheral surface of the side wall of the yoke 22 and the outer peripheral surface of the top plate 24. A voice coil 25 is inserted into the magnetic gap g. The voice coil 25 is secured to a substrate 26.

The magnetic circuit assembly 21 is supported by a first suspension 29 and a second suspension 27. The second suspension 27 has a tubular side wall portion 27a and a spiral leaf spring 27c integrally formed at a bottom 27b of the tubular side wall portion 27a. The spiral leaf spring 27c of the second suspension 27 is connected to the bottom of the yoke 22 of the magnetic circuit assembly 21 by laser welding or the like. A ring 28 is fitted to the inner peripheral surface of the upper end of the tubular side wall portion 27a to support the substrate 26 bonded thereto to close an upper end opening of the tubular side wall portion 27a. A ring-shaped weight 30 is secured to the outer peripheral surface of the yoke 22 as an additional weight. The second suspension 27 is covered in its entirety by a protector 31. The protector 31 has a bent portion 31a formed at the upper end thereof to retain the outer peripheral portion of the substrate 26. A shock absorbing member 32 is attached to the lower side of the substrate 26.

The first suspension 29 has, as shown in FIG. 4, an outer peripheral portion 29b, an inner peripheral portion 29c, and a pair of arcuate spring portions 29a provided in an annular space between the outer peripheral portion 29b and the inner peripheral portion 29c. The outer peripheral portion 29b is secured to the ring 28, and the inner peripheral portion 29c is secured to the top surface of the yoke 22 by laser welding. Specifically, the ring 28 is insert-molded together with the outer peripheral portion 29b of the first suspension 29.

In the vibrator having the above-described structure, the ring 28 used to secure the first suspension 29 to the tubular side wall portion 27a is insert-molded together with the outer peripheral portion 29b of the first suspension 29. Accordingly, the ring 28 requires a certain thickness and therefore may interfere with the vibration of the magnetic circuit assembly 21 when vibrating with a large amplitude. In addition, the arcuate spring portions 29a of the first suspension 29 are provided in a limited annular space between the inner peripheral portion 29c and the outer peripheral portion 29b. Therefore, the arcuate spring portions 29a cannot have a sufficiently long length and hence are likely to easily develop metal fatigue. It is necessary in order to minimize the metal fatigue to reduce the amplitude of vibration of the magnetic circuit assembly 21.

SUMMARY OF THE INVENTION

An object of the present invention is to provide a vibrator free from the above-described problems with the related art.

The present invention provides a vibrator including a casing having a bottom wall and a tubular side wall extending from the bottom wall. A substrate is provided to close an opening of the tubular side wall opposite the bottom wall. A magnetic circuit assembly is provided in the casing. The magnetic circuit assembly has a yoke with a bottom wall portion facing the bottom wall of the casing and a tubular peripheral wall portion extending from the bottom wall portion. The magnetic circuit assembly further has a magnet and a top plate that are successively stacked on the bottom wall portion of the yoke. A magnetic gap is formed between the inner peripheral surface of the peripheral wall portion of the yoke and the outer peripheral surface of the top plate. A voice coil is secured to the substrate and inserted into the magnetic gap in concentric relation to the peripheral wall portion of the yoke. A first suspension is connected between the substrate and the magnetic circuit assembly. A second suspension is connected between the magnetic circuit assembly and the bottom wall of the casing. The first suspension has at least one spring portion arcuately extending around the voice coil. The spring portion has an inner end and an outer end in a radial direction with respect to the axis of the peripheral wall portion of the yoke. The inner end is secured to the substrate, and the outer end is secured to the magnetic circuit assembly.

Thus, the vibrator according to the present invention is not provided with a ring such as that used in the above-described related-art vibrator to mount the first suspension and therefore allows the magnetic circuit assembly to vibrate with an increased amplitude. In addition, the spring portion of the first suspension is not provided in a limited annular space between the outer and inner peripheral portions as in the related-art vibrator. Therefore, the spring portion can be lengthened and made resistant to metal fatigue as compared to the related-art vibrator.

Specifically, the first suspension may have an inner fixed portion that is secured to the substrate and have two spring portions. The two spring portions are connected at the respective inner ends thereof to mutually diametrically opposing positions on the inner fixed portion and extend in symmetry to each other around the axis of the peripheral wall portion of the yoke.

Each spring portion may extend through an angle of at least 180° around the above-described axis from the inner end to the outer end. Further, each spring portion may extend through an angle of about 270°.

In the above-described related-art vibrator, each spring portion cannot extend through an angle exceeding 180°, whereas in the present invention, the range of extension of the spring portions can be increased to a considerable extent.

The magnetic circuit assembly may have a tubular weight secured to the outer peripheral surface of the peripheral wall portion of the yoke as an additional weight. In this case, the outer end of the spring portion is secured to an end surface of the weight.

More specifically, the vibrator may further include a mounting member that is insert-molded together with the inner fixed portion of the first suspension and secured to the substrate coaxially with the above-described axis. In this case, the voice coil is connected to the substrate through the mounting member.

The above and other objects, features and advantages of the present invention will become more apparent from the following description of the preferred embodiments thereof, taken in conjunction with the accompanying drawings.

DESCRIPTION OF THE PREFERRED EMBODIMENTS

Figures 1, 2:
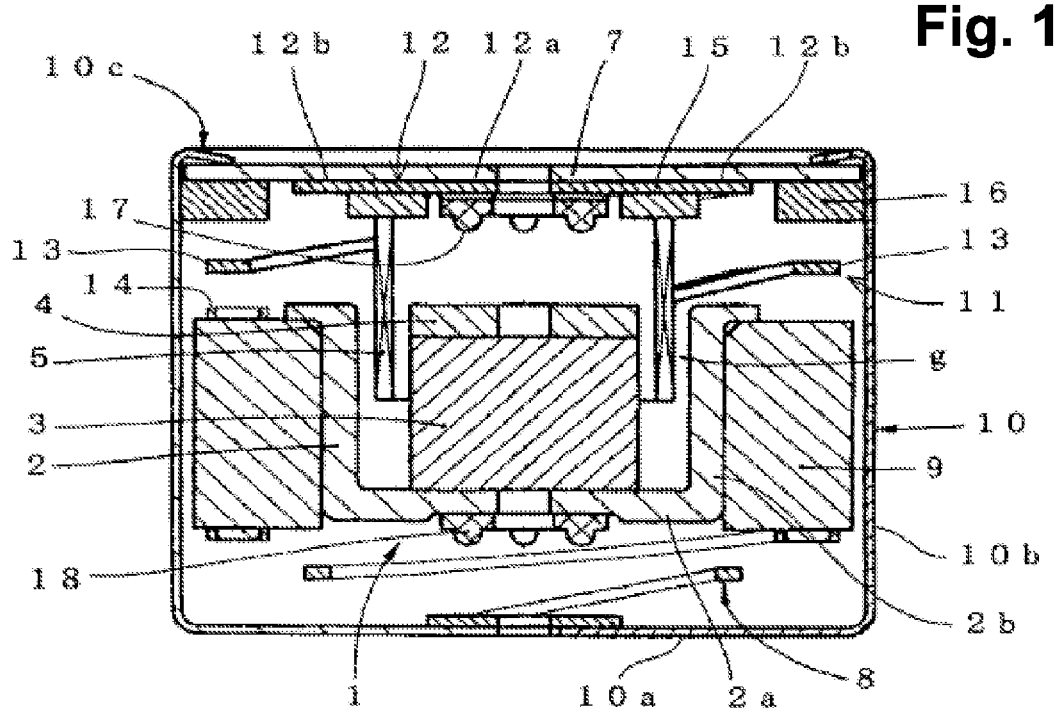
FIG. 1 is a sectional view of a vibrator according to an embodiment of the present invention.
FIG. 2 is a plan view of a first suspension of the vibrator shown in FIG. 1.
Figure 3:
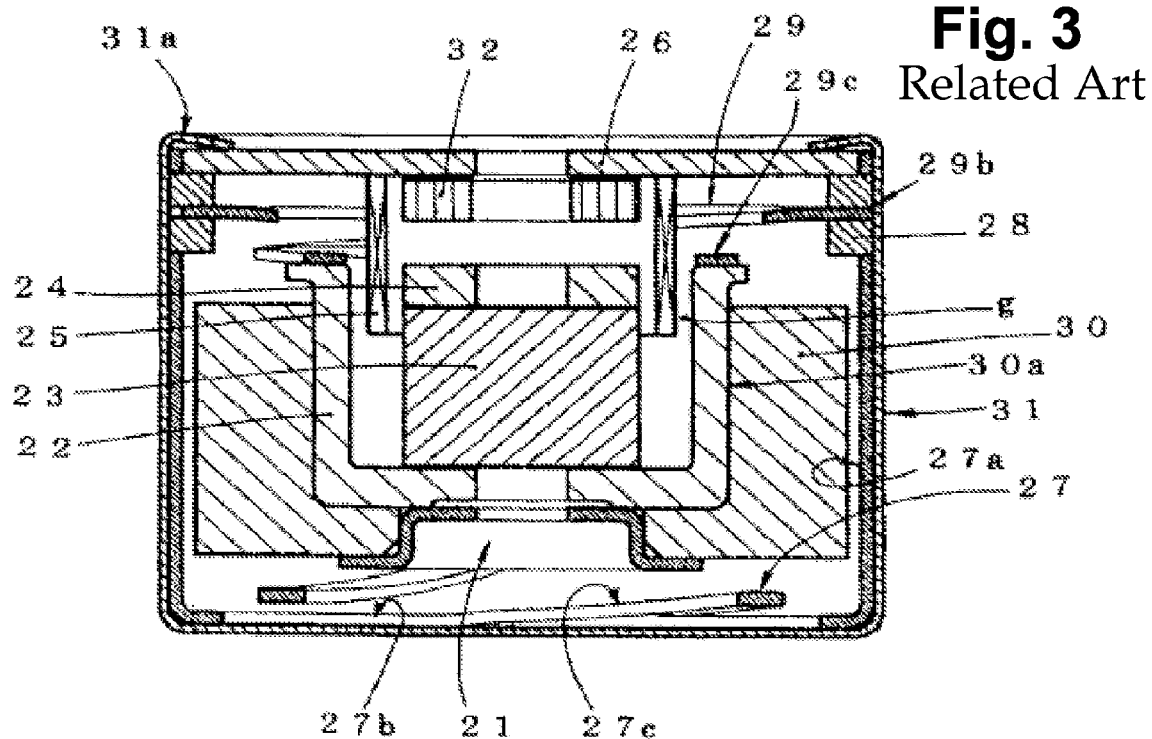
FIG. 3 is a sectional view of a vibrator according to a related art.
Figure 4:
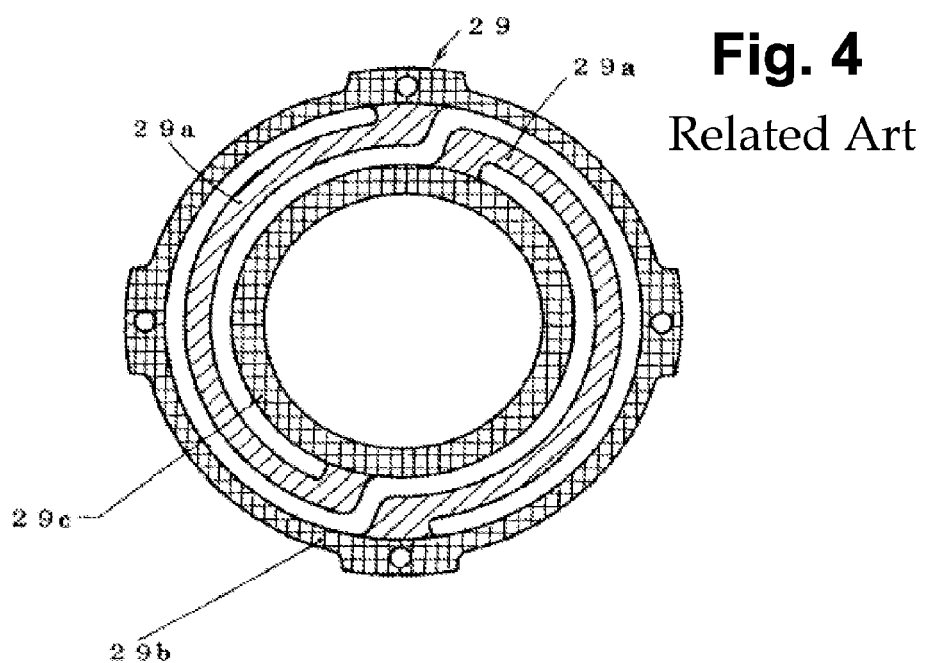
FIG. 4 is a plan view of a first suspension of the vibrator shown in FIG. 3.

An embodiment of the present invention will be described below in detail with reference to FIGS. 1 and 2.

A vibrator according to the embodiment of the present invention has a cup-shaped casing 10, a substrate 7 provided to close an upper end opening of the casing 10, a magnetic circuit assembly 1 provided in the casing 10, a first suspension 11 and a second suspension 8 that support the magnetic circuit assembly 1 from above and below, and a voice coil 5 secured to the substrate 7 and inserted into a magnetic gap g in the magnetic circuit assembly 1.

The casing 10 has a bottom wall 10a and a tubular side wall 10b extending from the bottom wall 10a. The substrate 7 has wiring (not shown) for connecting the voice coil 5 to a circuit provided outside the vibrator.

The magnetic circuit assembly 1 includes a cup-shaped yoke 2 having a bottom wall portion 2a disposed to face the bottom wall 10a of the casing 10 and a tubular peripheral wall portion 2b extending from the bottom wall portion 2a toward the substrate 7. The magnetic circuit assembly 1 further includes a magnet 3 and a top plate 4 that are successively stacked on the bottom wall portion 2a of the yoke 2. A magnetic gap g is formed between the outer peripheral surface of the top plate 4 and the inner peripheral surface of the peripheral wall portion 2b of the yoke 2. A weight 9 is secured to the peripheral surface of the peripheral wall portion 2b.

The first suspension 11, as seen in a plan view, has a configuration as shown in FIG. 2. That is, the first suspension 11 has an inner fixed portion 12 secured to the substrate 7. The inner fixed portion 12 has a radially inner ring-shaped portion 12a and a pair of extensions 12b extending radially outward away from each other from mutually diametrically opposing positions on the ring-shaped portion 12a. The first suspension 11 further has a pair of leaf spring portions 13 arcuately extending from the respective extensions 12b through an angle of about 270° in symmetry to each other around the axis of the voice coil 5. Further, the first suspension 11 has outer fixed portions 14 that are disposed at the distal end portions of the leaf spring portions 13 and secured to the upper end surface of the weight 9 of the magnetic circuit assembly 1.

In the illustrated example, the inner fixed portion 12 is secured to the substrate 7 by an annular mounting member 15. The mounting member 15 is insert-molded together with the inner fixed portion 12 by using a metal or other suitable material. The voice coil 5 is secured to the substrate 7 through the mounting member 15 and electrically connected to the wiring on the substrate 7. In this embodiment, the substrate 7 is secured by being clamped between a securing ring 16 fitted to the casing 10 near the upper end thereof and an upper-end bent portion 10c of the casing 10. The securing ring 16 is preferably formed thin from a metal or other suitable material. Buffering members 17 and 18 against vibration of the magnetic circuit assembly 1 are respectively provided on the central portion of the substrate 7 and the bottom wall portion 2a of the yoke 2.

In this vibrator, when a driving signal is input to the voice coil 5, the magnetic circuit assembly 1 is vibrated up and down. At this time, the leaf spring portions 13 of the first suspension 11 allow the magnetic circuit assembly 1 to vibrate with a large amplitude because the length of the leaf spring portions 13 is longer than in the related-art vibrator. In addition, metal fatigue of the leaf spring portions 13 is minimized. Further, the fact that the first suspension 11 is secured to the substrate 7 at the inner fixed portion 12 also allows the magnetic circuit assembly 1 to vibrate with a large amplitude.

It should be noted that the present invention is not necessarily limited to the foregoing embodiment but can be modified in a variety of ways without departing from the gist of the present invention.

What is claimed is:

1. A vibrator comprising:
   a casing having a bottom wall and a tubular side wall extending from said bottom wall;
   a substrate provided to close an opening of said tubular side wall opposite said bottom wall;
   a magnetic circuit assembly provided in said casing, said magnetic circuit assembly having a yoke with a bottom wall portion facing the bottom wall of said casing and a tubular peripheral wall portion extending from said bottom wall portion, said magnetic circuit assembly further having a magnet and a top plate that are successively stacked on the bottom wall portion of said yoke, wherein a magnetic gap is formed between an inner peripheral surface of the peripheral wall portion of said yoke and an outer peripheral surface of said top plate;
   a voice coil secured to said substrate and inserted into said magnetic gap in concentric relation to the peripheral wall portion of said yoke;
   a first suspension connected between said substrate and said magnetic circuit assembly; and
   a second suspension connected between said magnetic circuit assembly and the bottom wall of said casing;
   wherein said first suspension has at least one spring portion arcuately extending around said voice coil, said spring portion having an inner end and an outer end in a radial direction with respect to an axis of the peripheral wall portion of said yoke, said inner end being secured to said substrate, and said outer end being secured to said magnetic circuit assembly.

2. A vibrator according to claim 1, wherein said first suspension has an inner fixed portion that is secured to said substrate, and has two said spring portions, said two spring portions being connected at said inner ends to mutually diametrically opposing positions on said inner fixed portion and extending in symmetry to each other around said axis.

3. A vibrator according to claim 2, wherein said two spring portions each extend through an angle of at least 180° around said axis from said inner end to said outer end.

4. A vibrator according to claim 3, wherein said two spring portions each extend through an angle of about 270° with respect to said axis from said inner end to said outer end.

5. A vibrator according to claim 1, wherein said magnetic circuit assembly has a tubular weight secured to an outer peripheral surface of the peripheral wall portion of said yoke, and the outer end of said spring portion is secured to an end surface of said weight.

6. A vibrator according to claim 2, further comprising:
a mounting member insert-molded together with the inner fixed portion of said first suspension and secured to said substrate coaxially with said axis;
wherein said voice coil is connected to said substrate through said mounting member.

* * * * *